July 14, 1925.  
W. B. POWELL  
1,546,105  
ARTIFICIAL LURE FOR FISHHOOKS  
Filed Feb. 28, 1924

Inventor  
W. B. Powell,

Patented July 14, 1925.

1,546,105

UNITED STATES PATENT OFFICE.

WALTER B. POWELL, OF DORSEY, MARYLAND.

ARTIFICIAL LURE FOR FISHHOOKS.

Application filed February 28, 1924. Serial No. 695,784.

*To all whom it may concern:*

Be it known that I, WALTER B. POWELL, a citizen of the United States, residing at Dorsey, in the county of Anne Arundel and State of Maryland, have invented certain new and useful Improvements in Artificial Lures for Fishhooks; and I do hereby declare the following to be a full, clear, and exact description of the invention, such as will enable others skilled in the art to which it appertains to make and use the same.

The invention relates to a lure associated with a fish hook to impart a lifelike movement thereto when drawn through the water, whereby to attract the fish, the lure also serving as a weight and a guard to prevent the stripping of the bait from the hook.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
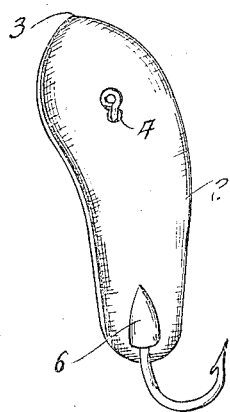
Figure 2:
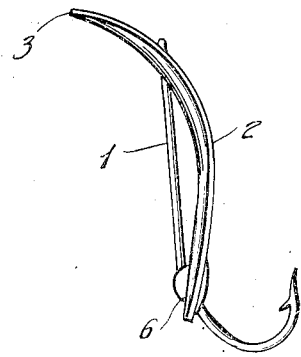
Figure 3:
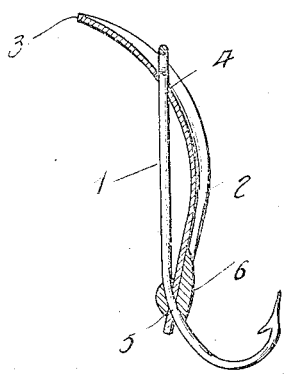
Figure 4:
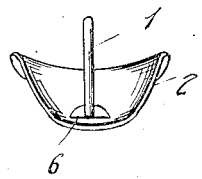
Figure 4:

Referring to the accompanying drawings forming a part of the application:

Figure 1 is a perspective view of a fish hook provided with an artificial lure embodying the invention, Figure 2 is a side view of the fish hook and lure, Figure 3 is a central longitudinal sectional view of the lure with the hook applied, and Figure 4 is an end view.

Corresponding and like parts are referred to in the following description and designated in the several views of the drawings by like reference characters.

The fish hook illustrated is of ordinary construction and the lure associated therewith is mounted upon the shank 1 and consists of an elongated plate 2 tapering throughout its length and pointed at its upper or outer end, as indicated at 3. The plate is longitudinally curved throughout its length and is transversely curved between its side edges, thereby presenting the approximate shape of a spoon. Openings 4 and 5 are provided near opposite ends of the plate and receive the shank 1 of the fish hook. When the lure is applied to the fish hook, it is arranged so that the longitudinally curved surface faces the point of the hook, the shank of the latter being disposed in the rear of the lure with its opposite end portions passing through the openings 4 and 5. The broad end of the lure is remote from the point of the hook and the narrow end is opposite the point of the hook and is weighted, as indicated at 6, said weight preferably consisting of solder arranged upon the front and the rear side of the lure and acting as means to secure the lure to the hook. The weight 6 is preferably made tapering upon the front side of the lure so as to pass readily through the water when trolling.

By reason of the peculiar shape of the lure and the provision and disposition of the weight 6, the hook has a wavelike movement imparted thereto when drawn through the water, thereby resembling the action of live bait which serves to attract the fish and increase the chances for a large catch.

What is claimed is:

1. A fish hook having an artificial lure applied to the shank thereof by means of openings therein through which the shank of the hook extends, the same being longitudinally curved and weighted at the end adjacent the point of the hook.

2. A fish hook having an artificial lure applied to the shank thereof and consisting of an elongated plate tapering and longitudinally curved throughout its length and arranged with the broad end remote from the point of the hook and with the convex side facing the point of the hook, said plate provided with openings through which the shank of the hook extends, and a weight applied to the narrow end of the lure adjacent the point of the hook.

3. A fish hook having an artificial lure applied to the shank thereof and consisting of an elongated plate tapering throughout its length and pointed at its outer end and longitudinally and transversely curved in reverse directions, and arranged with the longitudinally curved side facing the point of the hook and with the broad end remote from the point of the hook, the shank of the latter passing through openings in opposite ends of the lure and disposed in the rear of the latter, and said lure having a weight at its narrow end adjacent the point of the hook and adapted to coact with the broad end of the lure to impart a lifelike movement to the hook when drawn through the water.

In testimony whereof I affix my signature in presence of a witness.

WALTER B. POWELL.

Witness:
BENNETT S. JONES.